(12) United States Patent
Deng et al.

(10) Patent No.: US 11,715,238 B2
(45) Date of Patent: Aug. 1, 2023

(54) IMAGE PROJECTION METHOD, APPARATUS, DEVICE AND STORAGE MEDIUM

(71) Applicant: Apollo Intelligent Connectivity (Beijing) Technology Co., Ltd., Beijing (CN)

(72) Inventors: Sunan Deng, Beijing (CN); Yinghui Li, Beijing (CN)

(73) Assignee: Apollo Intelligent Connectivity (Beijing) Technology Co., Ltd., Beijing (CN)

( * ) Notice: Subject to any disclaimer, the term of this patent is extended or adjusted under 35 U.S.C. 154(b) by 25 days.

(21) Appl. No.: 17/352,858

(22) Filed: Jun. 21, 2021

(65) Prior Publication Data
US 2021/0312665 A1  Oct. 7, 2021

(30) Foreign Application Priority Data
Dec. 24, 2020 (CN) .......................... 202011554180.X

(51) Int. Cl.
*G06T 7/80* (2017.01)
*G02B 27/01* (2006.01)
(Continued)

(52) U.S. Cl.
CPC .............. *G06T 7/85* (2017.01); *G02B 27/01* (2013.01); *G06F 3/0677* (2013.01); *G06V 20/20* (2022.01);
(Continued)

(58) Field of Classification Search
CPC .... G02B 2027/0138; G02B 2027/0196; G02B 27/01; G06F 3/0677; G06T 7/80;
(Continued)

(56) References Cited

U.S. PATENT DOCUMENTS

| 10,282,915 B1 | 5/2019 | Lin et al. |
| 2014/0235891 A1* | 8/2014 | Li ...................... B01J 27/055 |
| | | 560/231 |

(Continued)

FOREIGN PATENT DOCUMENTS

| CN | 101763640 A | 6/2010 |
| CN | 107228681 A | 10/2017 |

(Continued)

OTHER PUBLICATIONS

Chinese Office Action dated Jan. 5, 2022 for Application Serial No. 202011554180.

(Continued)

*Primary Examiner* — Ming Wu
(74) *Attorney, Agent, or Firm* — Tucker Ellis LLP

(57) ABSTRACT

The present application discloses an image projection method, apparatus, device and storage medium and relates to the field of intelligent transportation, and the specific implementation thereof is: acquiring a first camera coordinate of an area to be calibrated in a camera coordinate system of an AR camera on a vehicle, where the area to be calibrated is located within a photographing range of the AR camera; acquiring a relative conversion relationship between a first extrinsic parameter matrix of the AR camera and a second extrinsic parameter matrix of a head-up display on the vehicle; determining, according to the first camera coordinate and the relative conversion relationship, a second camera coordinate of a projection symbol corresponding to the area to be calibrated in a coordinate system of the head-up display; and controlling, according to the second camera coordinate, the head-up display to project an image including the projection symbol.

18 Claims, 5 Drawing Sheets

(51) Int. Cl.
  *G06F 3/06* (2006.01)
  *G06V 20/20* (2022.01)
  *H04N 23/90* (2023.01)
(52) U.S. Cl.
  CPC ..... *H04N 23/90* (2023.01); *G02B 2027/0138* (2013.01); *G02B 2027/0196* (2013.01)
(58) Field of Classification Search
  CPC .......... G06T 7/85; G06V 20/20; H04N 5/247; H04N 9/3185; H04N 9/3194
  See application file for complete search history.

(56) References Cited

U.S. PATENT DOCUMENTS

| | | | |
|---|---|---|---|
| 2016/0283583 A1* | 9/2016 | Liu | G06F 40/284 |
| 2020/0160704 A1 | 5/2020 | Choi et al. | |
| 2020/0174560 A1 | 6/2020 | Park et al. | |
| 2021/0165220 A1* | 6/2021 | Nakada | G02B 27/0176 |
| 2022/0073280 A1* | 3/2022 | Gentilini | B65G 1/1375 |

FOREIGN PATENT DOCUMENTS

| | | |
|---|---|---|
| CN | 108195387 A | 6/2018 |
| CN | 109649275 A | 4/2019 |
| CN | 109688392 A | 4/2019 |
| CN | 109883439 A | 6/2019 |
| CN | 109884793 A | 6/2019 |
| CN | 109982006 A | 7/2019 |
| CN | 110136519 A | 8/2019 |
| CN | 111086453 A | 5/2020 |
| CN | 111121815 A | 5/2020 |
| CN | 111147834 A | 5/2020 |
| CN | 111405263 A | 7/2020 |
| CN | 111433067 A | 7/2020 |
| CN | 111612852 A | 9/2020 |
| WO | 2019/184885 A1 | 10/2019 |

OTHER PUBLICATIONS

European Search Report dated Dec. 9, 2021 for Application Serial No. 21180273.1.
Xiang, et al. "A Calibration Method for Automotive Augmented Reality Head-Up Displays using a Chessboard and Warping Maps," Proc. of SPIE vol. 11433, 2019.
Wientapper, et al. "A Camera-Based Calibration for Automotive Augmented Reality Head-Up-Displays," IEEE International Symposium on Mixed and Augmented Reality, 2013.
Gao, et al. "A Calibration Method for Automotive Augmented Reality Head-Up Displays Using a Chessboard and Warping Maps," Proc. of SPIE vol. 11433, 2019.
Notification to Grant Patent Right for Invention for corresponding Chinese Application No. 202011554180.X, dated Jul. 5, 2022, 6 pages.
"Smart Cars Showdown 2020", 11 pages.

* cited by examiner

IMAGE PROJECTION METHOD, APPARATUS, DEVICE AND STORAGE MEDIUM

CROSS-REFERENCE TO RELATED APPLICATION

This application claims priority to Chinese Patent Application No. 202011554180.X, filed on Dec. 24, 2020, which is hereby incorporated by reference in its entirety.

TECHNICAL FIELD

The present application relates to the field of intelligent transportation in data processing, and in particular, to an image projection method, apparatus, device and storage medium.

BACKGROUND

Head Up Display (HUD) is a technology that projects the key information of a vehicle onto the windshield of the vehicle, so that the driver can know the key information without looking down. Augmented Reality (AR) HUD is an implementation method that needs to superimpose the projected content with the real scene on the basis of projection.

In ARHUD projection, since the projected content is required to be superimposed with the real scene, the image needs to be projected to the corresponding position of the windshield. The current implementation of ARHUD is that: the person sits in the driving position and projects through an AR image, and then adjusts the relevant parameters according to the position of the projected image, so as to realize the superposition of the projected image and real scene by continuous manual trials and adjustments.

Due to continuous manual adjustments and trials, the above solution is complicated in operation and low in efficiency.

SUMMARY

The present application provides an image projection method, apparatus, device and storage medium.

According to a first aspect of the present application, there is provided an image projection method, including:

acquiring a first camera coordinate of an area to be calibrated in a camera coordinate system of an AR camera on a vehicle, where the area to be calibrated is located within a photographing range of the AR camera;

acquiring a relative conversion relationship between a first extrinsic parameter matrix of the AR camera and a second extrinsic parameter matrix of a head-up display on the vehicle;

determining, according to the first camera coordinate and the relative conversion relationship, a second camera coordinate of a projection symbol corresponding to the area to be calibrated in a coordinate system of the head-up display; and controlling, according to the second camera coordinate, the head-up display to project an image including the projection symbol.

According to a second aspect of the present application, there is provided an image projection apparatus, including:

a first acquisition module, configured to acquire a first camera coordinate of an area to be calibrated in a camera coordinate system of an AR camera on a vehicle, where the area to be calibrated is located within a photographing range of the AR camera;

a second acquisition module, configured to acquire a relative conversion relationship between a first extrinsic parameter matrix of the AR camera and a second extrinsic parameter matrix of a head-up display on the vehicle;

a determination module, configured to determine, according to the first camera coordinate and the relative conversion relationship, a second camera coordinate of a projection symbol corresponding to the area to be calibrated in a coordinate system of the head-up display; and a processing module, configured to control according to the second camera coordinate, the head-up display to project an image, where the image includes the projection symbol.

According to a third aspect of the present application, there is provided an electronic device, including:

at least one processor; and a memory communicatively connected with the at least one processor; where, the memory stores instructions executable by the at least one processor, and the instructions are executed by the at least one processor to enable the at least one processor to perform the method according to any one of the first aspect.

According to a fourth aspect of the present application, there is provided a non-transitory computer-readable storage medium storing computer instructions, where the computer instructions are used to cause a computer to perform the method according to any one of the first aspect.

According to a fifth aspect of the present application, there is provided a computer program product, including: a computer program stored in a readable storage medium from which at least one processor of an electronic device can read the computer program, and the at least one processor executes the computer program to cause the electronic device to execute the method according to the first aspect.

The image projection method, apparatus, device, and storage medium provided by the embodiments of the present application first acquire the first camera coordinate of the area to be calibrated in the camera coordinate system of the AR camera on the vehicle, then acquire the relative conversion relationship between the first extrinsic parameter matrix of the AR camera and the second extrinsic parameter matrix of the head-up display on the vehicle, and determine, according to the first camera coordinate and the relative conversion relationship, the second camera coordinate of the projection symbol corresponding to the area to be calibrated in the coordinate system of the head-up display, so as to control, according to the second camera coordinate, the head-up display to project the image, where the image includes the projection symbol. In the solution of the embodiments of the present application, the first camera coordinate (recognized by the AR camera) of the area to be calibrated are converted to the coordinate system of the head-up display through the relative conversion relationship between the first extrinsic parameter matrix and the second extrinsic parameter matrix. Then the second camera coordinate of the projection symbol under the head-up display are obtained. According to the second camera coordinate, the image is projected, and finally, the real scene superposition of the projection symbol and the area to be calibrated is realized after the image is projected. The operation is simple and efficient, eliminating the need to manually adjust the parameters and repeated attempts.

Understanding that what is described herein is not intended to identify key or important features of the embodiments of the present application, nor is it used to limit the scope of the present application, and other features of the present application will become apparent from the following description.

BRIEF DESCRIPTION OF THE DRAWINGS

The accompanying drawings are used for better understanding of the solution and do not constitute a limitation to the present application, in which.

DESCRIPTION OF EMBODIMENTS

The exemplary embodiments of the present application are described below with reference to the accompanying drawings, including various details of the embodiments of the present application that are useful for understanding the present application, and should be considered as merely exemplary. Therefore, those of ordinary skill in the art should realize that various changes and modifications can be made to the embodiments described herein without departing from the scope and spirit of the present application. Likewise, for clarity and conciseness, descriptions of well-known functions and structures are omitted in the following description.

HUD: Head Up Display, also called head-up display or head-up display system, is a technology that centers around the driver, projects important driving information, such as vehicle speed and navigation information, on the windshield in front of the driver, and enables the driver to see important driving information without looking down to the instrument cluster or turning his head.

AR: Augmented Reality. In the present application, based on HUD, ARHUD uses an optical system with a specially-designed interior to accurately combine image information with actual traffic conditions, and projects information such as tire pressure, vehicle speed, rotations per minute, or navigation information to the front windshield, so that the driver does not need to look down or turn his/her head to obtain important driving information. The projected information can be fused with real scenes in front of the vehicle.

Intrinsic parameter matrix: a parameter of the camera. The intrinsic parameter matrix is a matrix that transforms 3D camera coordinate to 2D pixel image coordinate and realizes coordinate conversion between the camera coordinate system and the pixel coordinate system.

Extrinsic parameter matrix: a parameter of the camera. The extrinsic parameter matrices includes rotation matrix and translation vector. The rotation matrix and translation vector together describe how to convert a point from the world coordinate system to the camera coordinate system. The rotation matrix describes the direction of the coordinate axis of the world coordinate system relative to that of the camera coordinate system. The translation vector describes the position of the spatial origin in the camera coordinate system. The extrinsic parameter matrices can realize the coordinate conversion between the world coordinate system and the camera coordinate system.

Figure 1:
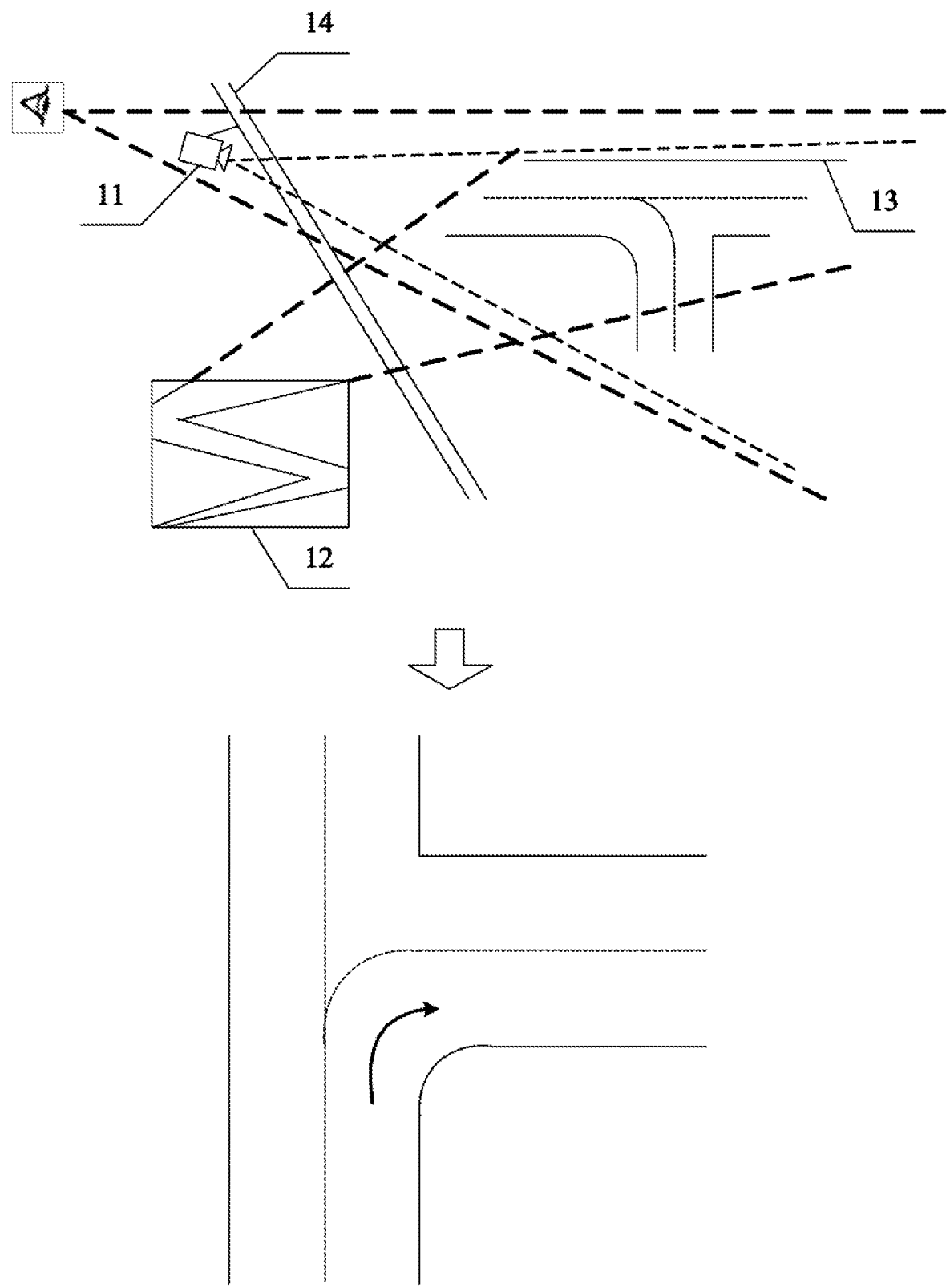
FIG. 1 is a schematic diagram of an application scenario according to an embodiment of the present application.

FIG. 1 is a schematic diagram of an application scenario according to an embodiment of the present application. As shown in FIG. 1, the vehicle includes an AR camera 11 and a head-up display 12. A photographing range of the AR camera 11 is indicated by the dotted line in FIG. 1. There is a road segment 13 in front of the vehicle, and the AR camera 11 can photograph pictures in front of the vehicle, where the road segment 13 is within the photographing range of the AR camera 11.

The head-up display 12 is configured to project pictures on a windshield 14. The driver can see the projected pictures on the windshield 14 when looking ahead while driving. It is necessary to fuse the projected pictures with the real scenes in front of the vehicle when the driver in the driving position observes the front.

For example, the real scene in front of the vehicle is the road segment 13. As shown in the lower part of FIG. 1, the road segment 13 is an intersection, including a right-turn intersection and a straight intersection. At this point, the AR camera can photograph pictures in front of the vehicle and identify the intersection. The head-up display 12 needs to project a right-turn arrow in the picture, and the right-turn arrow observed by the driver is expected to just correspond to the right-turn intersection. The image at the bottom of FIG. 1 is the superimposed image of the right-turn arrow observed by the driver and the right-turn intersection.

In the process of picture projection, the projected picture needs to be located at the corresponding position of the windshield, because the projected picture content needs to be superimposed with the real scene. Currently, in order to implement picture projection, a man sits in the driving position and identifies the area to be calibrated in the pictures photographed by the AR camera. Then the head-up display projects the picture, people observe the superposition effect of the projected picture and the real scene, and then manually adjust the parameters, try many times until the projected picture and the real scene are superimposed. This complex way of operation is inefficient.

Regarding to this problem, the embodiment of the present application provides an easily-operated image projection scheme, which can improve the image projection efficiency and eliminate the needs of manual adjustments and attempts. The following will introduce the scheme of this application in combination with the attached pictures.

Figure 2:
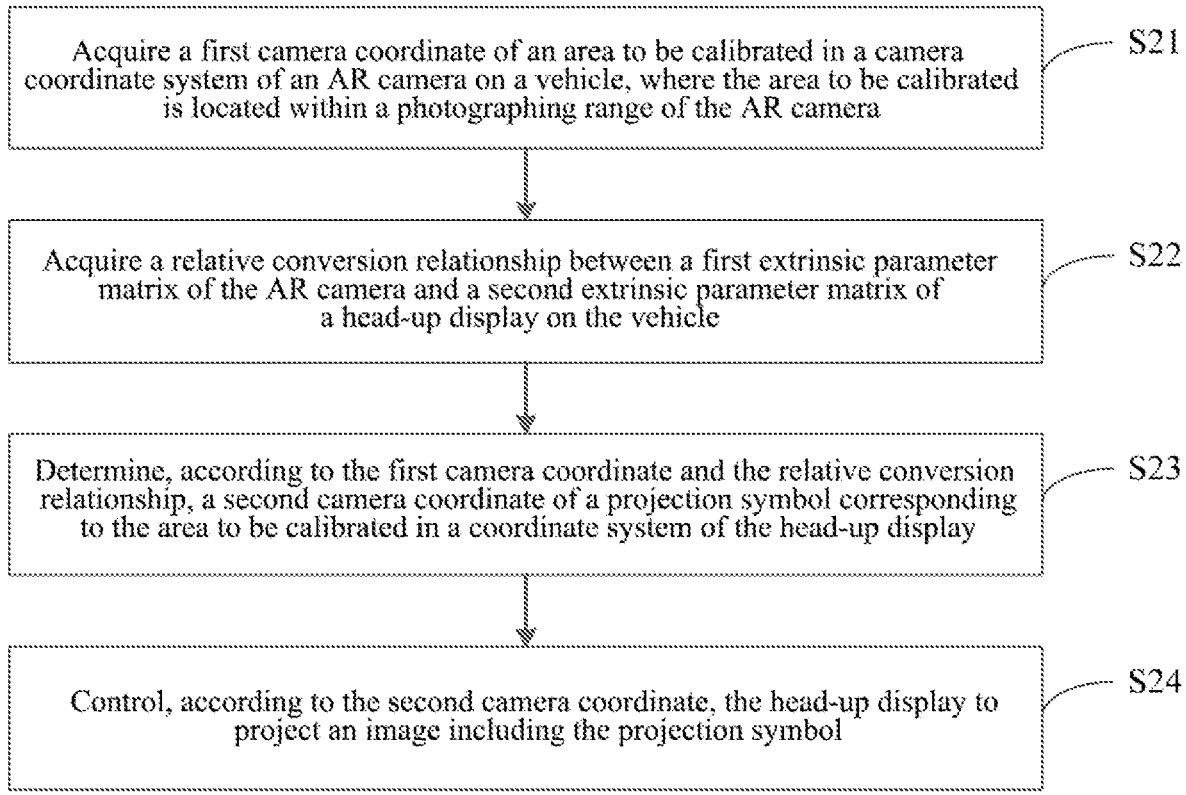
FIG. 2 is a schematic flowchart of an image projection method according to an embodiment of the present application.

FIG. 2 is a schematic flowchart of an image projection method according to an embodiment of the present application. As shown in FIG. 2, the method includes:

S21, acquire a first camera coordinate of an area to be calibrated in a camera coordinate system of an AR camera on a vehicle, where the area to be calibrated is located within a photographing range of the AR camera.

The AR camera is a vehicle-mounted camera, which can be used to photograph pictures in front of the vehicle and identify the area to be calibrated from the pictures. The area to be calibrated is an area to be calibrated by image projection, and the area to be calibrated is within a photographing range of the AR camera. For example, a common area to be calibrated can be a left-turn intersection, a right-turn intersection, a straight intersection, a U-turn area, and so on.

The areas to be calibrated is set in advance, and then pictures photographed by the AR camera are acquired. When the area to be calibrated appears in the pictures photographed by the AR camera, it can be identified and the first camera coordinate of the area to be calibrated in the camera coordinate system of the AR camera can be acquired.

S22, acquire a relative conversion relationship between a first extrinsic parameter matrix of the AR camera and a second extrinsic parameter matrix of a head-up display on the vehicle.

The head-up display is a device on the vehicle and is used to project an image on a windshield of the vehicle. The extrinsic parameter matrices can realize coordinate conversion between a world coordinate system and the camera coordinate system. For example, according to the first extrinsic parameter matrix of the AR camera, the first camera coordinate of the area to be calibrated can be converted into the corresponding coordinate in the world coordinate system. In the embodiment of the present application, it is necessary to acquire the relative conversion relationship between the first extrinsic parameter matrix of the AR camera and the second extrinsic parameter matrix of the head-up display. This is because at the end, the image is projected by the head-up display, the projected image needs to be fused with the real scene, and the area to be calibrated is the real scene.

S23, determine, according to the first camera coordinate and the relative conversion relationship, a second camera coordinate of a projection symbol corresponding to the area to be calibrated in a coordinate system of the head-up display.

After the relative conversion relationship between the first extrinsic parameter matrix and the second extrinsic parameter matrix is acquired, the first camera coordinate is converted into the coordinate of the area to be calibrated in the world coordinate system according to the first extrinsic parameter matrix, and then the second extrinsic parameter matrix is acquired according to the relative conversion relationship and the first extrinsic parameter matrix. The camera coordinate of the area to be calibrated in the coordinate system of the head-up display is acquired according to the second extrinsic parameter matrix.

The projection symbol needs to be finally projected on the windshield and be fused with the real scene. For example, the area to be calibrated is a right-turn intersection, and the projection symbol is a right-turn arrow. The effect to be achieved is that the position of the right-turn arrow is exactly on the right-turn intersection when viewed from the driving position, so the symbol and the real scene are fused. Therefore, after the camera coordinate of the area to be calibrated in the coordinate system of the head-up display is determined, the second camera coordinate of the projection symbol in the coordinate system of the head-up display can be determined accordingly.

S24, control, according to the second camera coordinate, the head-up display to project an image including the projection symbol.

After the second camera coordinate of the projection symbol is determined, the head-up display can be controlled to project the image, the image includes to projection symbol, and according to the second camera coordinate of the projection symbol, the position of the projection symbol in the image can be determined and the image can be projected.

The image projection method provided by the embodiment of the present application first acquires the first camera coordinate of the area to be calibrated in the camera coordinate system of the AR camera on the vehicle, and then acquires the relative conversion relationship between the first extrinsic parameter matrix of the AR camera and the second extrinsic parameter matrix of the head-up display on the vehicle, and determines, according to the first camera coordinate and the relative conversion relationship, the second camera coordinate of the projection symbol corresponding to the area to be calibrated in the coordinate system of the head-up display, so as to control, according to the second camera coordinate, the head-up display to project the image, where the image includes the projection symbol. In the solution of the embodiments of the present application, the first camera coordinate (recognized by the AR camera) of the area to be calibrated are converted to the coordinate system of the head-up display through the relative conversion relationship between the first extrinsic parameter matrix and the second extrinsic parameter matrix. Then the second camera coordinate of the projection symbol under the head-up display are obtained. According to the second camera coordinate, the image is projected, and finally, the real scene superposition of the projection symbol and the area to be calibrated is realized after the image is projected. The operation is simple and efficient, eliminating the need to manually adjust the parameters and repeated attempts.

The solution of the present application will be described in detail below in conjunction with the accompanying drawings.

Figure 3:
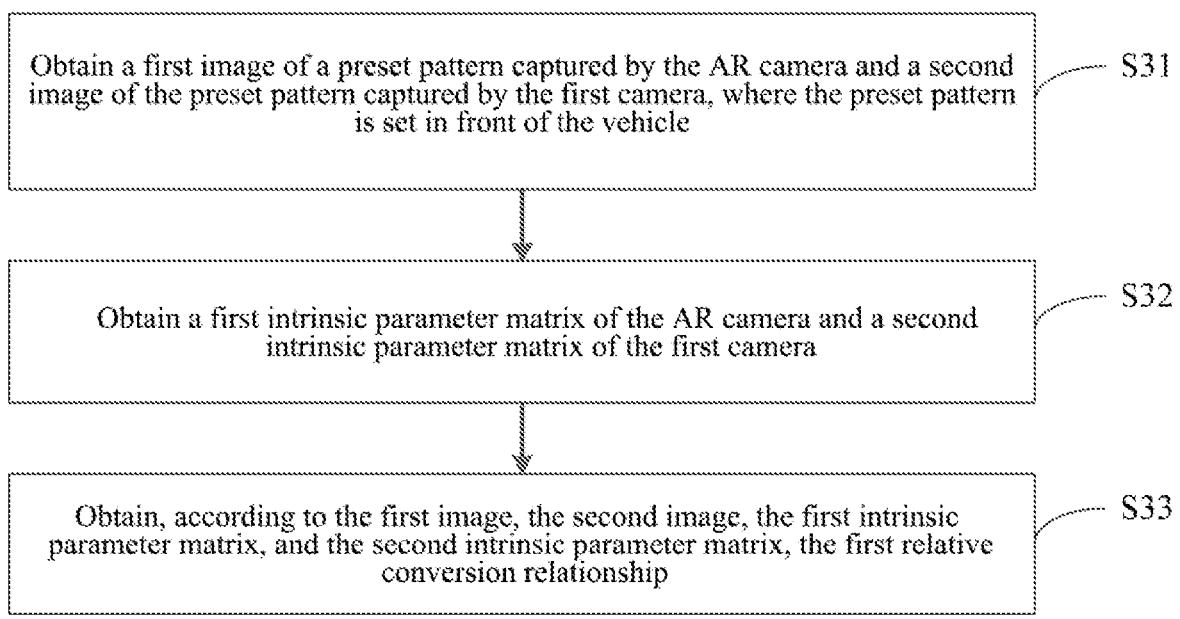
FIG. 3 is a schematic flowchart of acquiring a relative conversion relationship according to an embodiment of the present application.

FIG. 3 is a schematic flowchart of acquiring a relative conversion relationship provided by an embodiment of the present application. As shown in FIG. 3, the diagram includes:

S31, acquire the first relative conversion relationship between the first extrinsic parameter matrix and the third extrinsic parameter matrix of the first camera, and the first camera is set at a preset position on the driving position of the vehicle.

The first camera is a camera at a preset position of the driving position of the vehicle. The photographing range of the first camera is close to the observation range of the driver sitting at the driving position. The preset position of the first camera at the driving position can be determined according to the approximate orientation of the driver's eyes.

Figure 4:
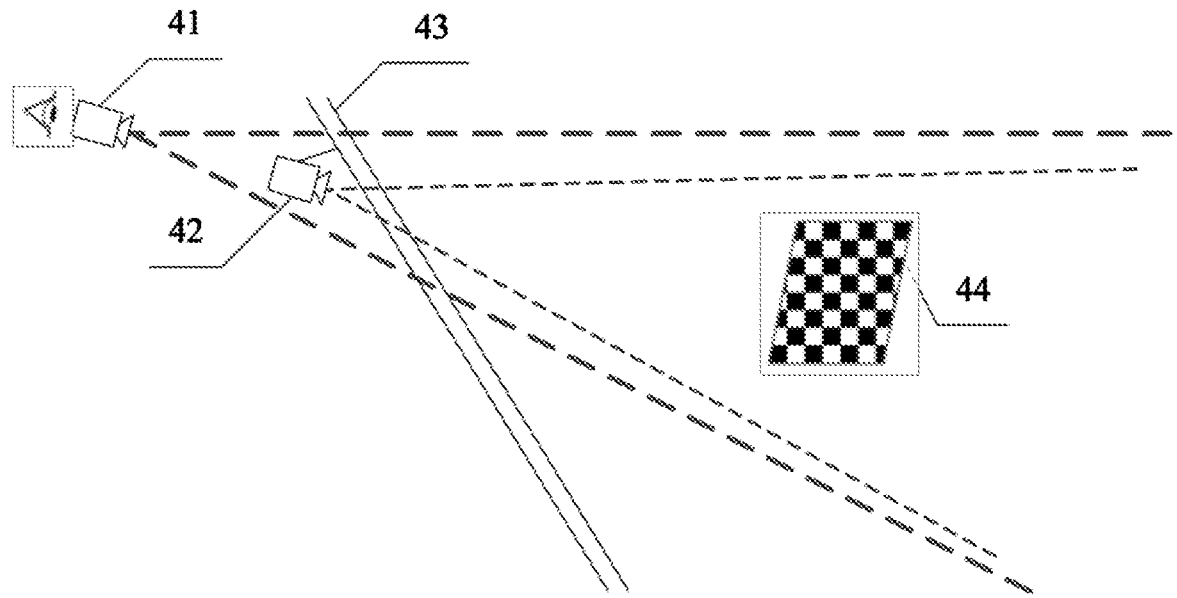
FIG. 4 is a schematic diagram of acquiring a first relative conversion relationship according to an embodiment of the present application.

FIG. 4 is a schematic diagram of acquiring a first relative conversion relationship according to an embodiment of the present application. As shown in FIG. 4, a first camera 41, an AR camera 42, and a windshield 43 are included. A preset position of the first camera 41 is close to the position of the driver's eyes. The dotted lines in FIG. 4 are the photographing ranges of the first camera 41 and the AR camera 42 respectively.

To acquire the first relative conversion relationship between the first extrinsic parameter matrix of the AR camera and the third extrinsic parameter matrix of the first camera, a reference object needs to be set. The AR camera and the first camera need to photograph this reference object, and then obtain the first relative conversion relationship according to coordinate conversion.

Specifically, a preset pattern can be set in front of the vehicle. The AR camera photographs the preset pattern to obtain a first image, and the first camera photographs the preset pattern to obtain a second image. Then, a first intrinsic parameter matrix of the AR camera and a second intrinsic parameter matrix of the first camera are acquired. The intrinsic parameter matrix is fixed parameters of the camera, which can be directly obtained. The intrinsic parameter matrix can realize the coordinate conversion between the camera coordinate system and the pixel coordinate system.

After the first intrinsic parameter matrix and the second intrinsic parameter matrix are obtained, the first relative conversion relationship can be acquired according to the first image, the second image, the first intrinsic parameter matrix, and the second intrinsic parameter matrix.

Specifically, for any first preset point on the preset pattern, a first world coordinate of the first preset point in a world coordinate system, a first image coordinate corresponding to the first preset point on the first image, and a second image coordinate corresponding to the first preset point on the second image can be acquired. The first image coordinate is a coordinate of the first preset point in a pixel coordinate system of the AR camera, and the second image coordinate is a coordinate of the first preset point in a pixel coordinate system of the first camera.

After the first world coordinate, the first image coordinate, and the second image coordinate are acquired, a first posture of the AR camera can be acquired according to the first world coordinate, the first image coordinate, and the first intrinsic parameter matrix, and a second posture of the first camera can be acquired according to the first world coordinate, the second image coordinate, and the second intrinsic parameter matrix.

After the first posture and the second posture are obtained, the first relative conversion relationship can be acquired according to the first posture and the second posture. The process will be described below in conjunction with FIG. 4.

As shown in FIG. 4, the preset pattern being a checkerboard 44 is taken as an example, the AR camera 42 and the first camera 41 photograph the checkerboard 44 in front of the vehicle to obtain the first image and the second image, respectively.

A corner point of the checkerboard 44 is taken as the first preset point. The first world coordinate of the first preset point in the world coordinate system is $(x_i, y_i)$. The first image coordinate $(u_{2i}, v_{2i})$ of the first preset point in the pixel coordinate system of the AR camera 42 is then obtained according to the first image, and the second image coordinate $(u_{1i}, v_{1i})$ of the first preset point in the pixel coordinate system of the first camera 41 is obtained according to the second image.

It is supposing that the first intrinsic parameter matrix of the AR camera 42 is $I_a$, the first posture is $[R_a|t_a]$, the second intrinsic parameter matrix of the first camera 41 is $I_e$, and the second posture is $[R_e|t_e]$.

Then the following equation can be obtained:

$$s_{2i}\begin{bmatrix} u_{2i} \\ v_{2i} \\ 1 \end{bmatrix} = I_a [I\ 0] \begin{bmatrix} R_a & t_a \\ 0 & 1 \end{bmatrix} \begin{bmatrix} x_i \\ y_i \\ 0 \\ 1 \end{bmatrix} \quad (1)$$

$$s_{1i}\begin{bmatrix} u_{1i} \\ v_{1i} \\ 1 \end{bmatrix} = I_e [I\ 0] \begin{bmatrix} R_e & t_e \\ 0 & 1 \end{bmatrix} \begin{bmatrix} x_i \\ y_i \\ 0 \\ 1 \end{bmatrix} \quad (2)$$

where $S_{1i}$ is a scale factor of the first camera. $s_{2i}$ is a scale factor of the AR camera, and I is an identity matrix. The equation (1) represents a coordinate conversion equation of the first preset point between the pixel coordinate system of the AR camera and the world coordinate system. The equation (2) represents a coordinate conversion equation of the first preset point between the pixel coordinate system of the first camera and the world coordinate system.

According to the equation (1), the first posture $[R_a|t_a]$ can be obtained, and according to the equation (2), the second posture $[R_e|t_e]$ can be obtained, where $R_a$ is a rotation matrix of the AR camera, $t_a$ is a translation vector corresponding thereto, $R_e$ is a rotation matrix of the first camera, and $t_e$ is a translation vector corresponding thereto.

After the first posture and the second posture are obtained, the first relative conversion relationship can be obtained:

$$\begin{bmatrix} R_e & t_e \\ 0 & 1 \end{bmatrix} = \begin{bmatrix} R_{ae} & t_{ae} \\ 0 & 1 \end{bmatrix} \begin{bmatrix} R_a & t_a \\ 0 & 1 \end{bmatrix} \quad (3)$$

where $$\begin{bmatrix} R_e & t_e \\ 0 & 1 \end{bmatrix}$$

is the third extrinsic parameter matrix, and $$\begin{bmatrix} R_a & t_a \\ 0 & 1 \end{bmatrix}$$

is the first extrinsic parameter matrix.

S32, acquire a second relative conversion relationship between the second extrinsic parameter matrix and the third extrinsic parameter matrix.

After the first relative conversion relationship is acquired, it also needs to acquire the second relative conversion relationship between the second extrinsic parameter matrix and the third extrinsic parameter matrix, so as to acquire the relationship between the first extrinsic parameter matrix and the second extrinsic parameter matrix. The method for acquiring the second relative conversion relationship is similar to that for the first relative conversion relationship, which will be described in detail below.

First, it needs to acquire a third image projected by the head-up display and a fourth image obtained by photographing the third image with the first camera, where resolutions of the third image and that of the fourth image are the same.

Then, it needs to acquire a second intrinsic parameter matrix of the first camera and a third intrinsic parameter matrix of the head-up display, and acquire, according to the third image, the fourth image, the second intrinsic parameter matrix, and the third intrinsic parameter matrix, a second relative conversion relationship.

Specifically, for any second preset point on the third image, a second world coordinate of the second preset point in the world coordinate system, a third image coordinate corresponding to the second preset point on the third image, and a fourth image coordinate corresponding to the second preset point on the fourth image can be acquired, where the third image coordinate is a coordinate of the second preset point in a pixel coordinate system of the head-up display, and the fourth image coordinate is a coordinate of the second preset point in the pixel coordinate system of the first camera.

After the second world coordinate, the third image coordinate, and the fourth image coordinate are acquired, a third posture of the head-up display can be acquired according to the second world coordinate, the third image coordinate, and the third intrinsic parameter matrix, and a second posture of the first camera can be acquired according to the second world coordinate, the fourth image coordinate, and the second intrinsic parameter matrix.

According to the third posture and the second posture are obtained, the second relative conversion relationship can be acquired. The process will be described below in conjunction with FIG. 5.

Figure 5:
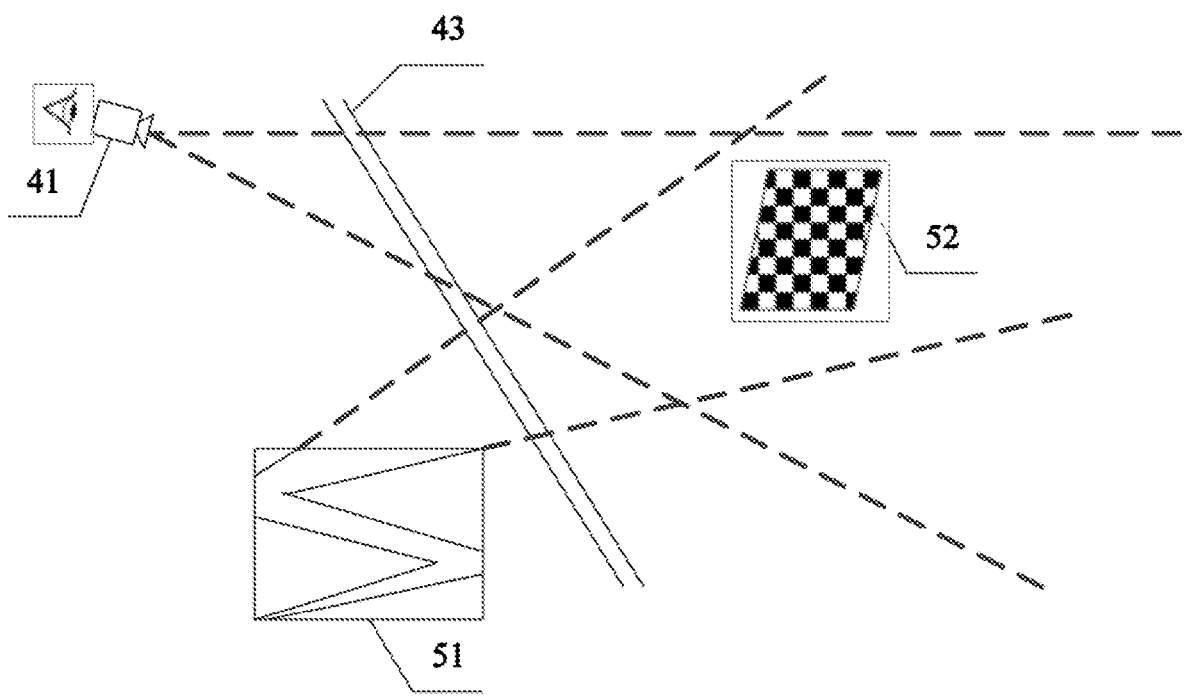
FIG. 5 is a schematic diagram of acquiring a second relative conversion relationship according to an embodiment of the present application.

FIG. 5 is a schematic diagram of acquiring a second relative conversion relationship according to an embodiment of the present application. As shown in FIG. 5, a first camera 41, a head-up display 51, and a windshield 43 are included. The preset position of the first camera 41 is close to the position of the driver's eyes.

A checkerboard image 52 is generated, a corner point of the checkerboard image 52 is taken as the second preset point, and the second world coordinate of the second preset point in the world coordinate system is $(x_j, y_j)$. The checkerboard image 52 is projected by the head-up display 51 to obtain the third image, and the first camera 41 photographs the checkerboard image 52 projected by the head-up display 51 to obtain the fourth image.

According to the third image, the third image coordinate $(u_{1j}, v_{1j})$ of the second preset point in the pixel coordinate system of the head-up display 51 is obtained, and according to the fourth image, the fourth image coordinate $(u_{2j}, v_{2j})$ of the second preset point in the pixel coordinate system of the first camera 41 is obtained.

It is supposing that the third intrinsic parameter matrix of the head-up display 51 is $I_a$, the third posture is $[R_h|t_h]$, the second intrinsic parameter matrix of the first camera 41 is $I_e$, and the second posture is $[R_e|t_e]$.

Then the following equation can be obtained:

$$s_{1j} \begin{bmatrix} u_{1j} \\ v_{1j} \\ 1 \end{bmatrix} = I_a [I\ 0] \begin{bmatrix} R_h & t_h \\ 0 & 1 \end{bmatrix} \begin{bmatrix} x_j \\ y_j \\ 0 \\ 1 \end{bmatrix} \quad (4)$$

$$s_{2j} \begin{bmatrix} u_{2j} \\ v_{2j} \\ 1 \end{bmatrix} = I_e [I\ 0] \begin{bmatrix} R_e & t_e \\ 0 & 1 \end{bmatrix} \begin{bmatrix} x_j \\ y_j \\ 0 \\ 1 \end{bmatrix} \quad (5)$$

where $s_{1j}$ is a scale factor of the head-up display, $s_{2j}$ is a scale factor of the first camera, and I is an identity matrix. The equation (4) represents a coordinate conversion equation of the second preset point between the pixel coordinate system of the head-up display and the world coordinate system. The equation (5) represents a coordinate conversion equation of the second preset point between the pixel coordinate system of the first camera and the world coordinate system.

According to the equation (4), the third posture $[R_h|t_h]$ can be obtained, and according to the equation (5), the second posture $[R_e|t_e]$ can be obtained, where $R_h$ is a rotation matrix of the head-up display, and $t_h$ is a translation vector corresponding thereto, $R_e$ is a rotation matrix of the first camera, and $t_e$ is a translation vector corresponding thereto.

After the third posture and the second posture are obtained, the second relative conversion relationship can be obtained:

$$\begin{bmatrix} R_e & t_e \\ 0 & 1 \end{bmatrix} = \begin{bmatrix} R_{he} & t_{he} \\ 0 & 1 \end{bmatrix} \begin{bmatrix} R_h & t_h \\ 0 & 1 \end{bmatrix} \quad (6)$$

where $$\begin{bmatrix} R_e & t_e \\ 0 & 1 \end{bmatrix}$$

is the third extrinsic parameter matrix, and $$\begin{bmatrix} R_h & t_h \\ 0 & 1 \end{bmatrix}$$

is the second extrinsic parameter matrix.

S33, acquire, according to the first relative conversion relationship and the second relative conversion relationship, the relative conversion relationship.

According to the equation (3) and equation (6), the following equation can be obtained:

$$\begin{bmatrix} R_h & t_h \\ 0 & 1 \end{bmatrix} = \left( \begin{bmatrix} R_{ae} & t_{ae} \\ 0 & 1 \end{bmatrix}^{-1} \begin{bmatrix} R_{he} & t_{he} \\ 0 & 1 \end{bmatrix} \right) \begin{bmatrix} R_a & t_a \\ 0 & 1 \end{bmatrix} \quad (7)$$

That is, the relative conversion relationship $T_{ah}$ is:

$$T_{ah} = \begin{bmatrix} R_{ae} & t_{ae} \\ 0 & 1 \end{bmatrix}^{-1} \begin{bmatrix} R_{he} & t_{he} \\ 0 & 1 \end{bmatrix} \quad (8)$$

The calibration result of the equation (8) is stored in configuration file or database for subsequent image projection.

Specifically, a third camera coordinate of the area to be calibrated in the coordinate system of the head-up display can be determined according to the first camera coordinate and the relative conversion relationship, and then the second camera coordinate can be determined according to a real scene superimposition between the area to be calibrated and the projection symbol, as well as the third camera coordinate. Finally, according to the second camera coordinate, the head-up display is controlled to project an image including the projection symbol according to the second camera coordinate.

Figure 6:
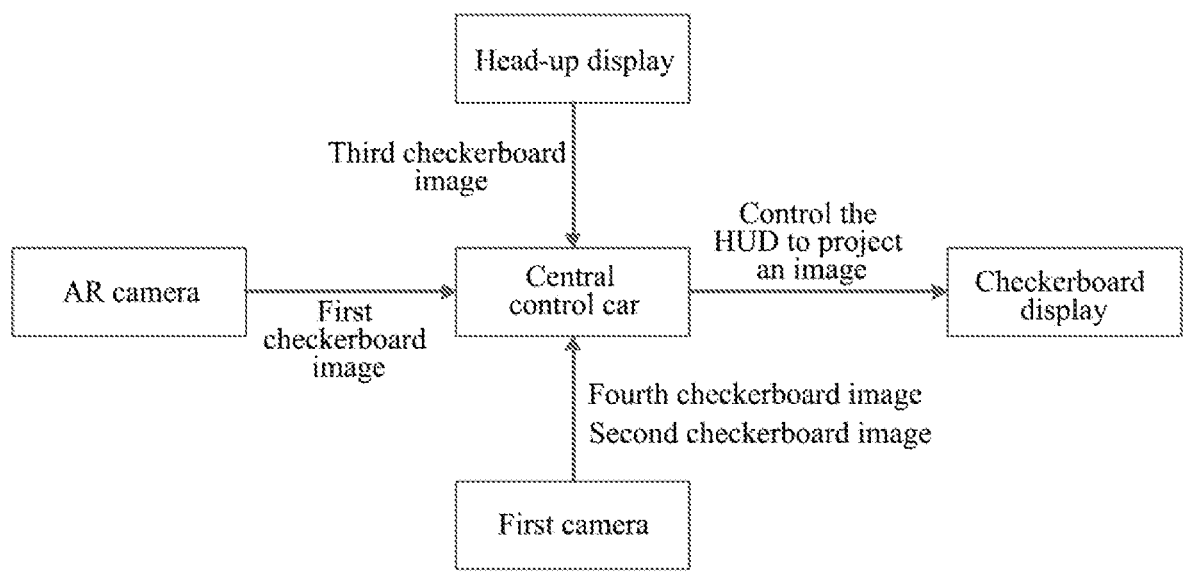
FIG. 6 is a block diagram of an image projection system according to an embodiment of the present application.

FIG. 6 is a block diagram of an image projection system according to an embodiment of the present application. As shown in FIG. 6, it includes a center panel, an AR camera, a first camera, a checkerboard display screen, and a head-up display.

The AR camera and the first camera respectively photograph the checkerboard, and obtain a first checkerboard image (namely the first image in the above-mentioned embodiment) and a second checkerboard image (namely the second image in the above-mentioned embodiment) respectively. Then, the AR camera sends the first checkerboard image to the center panel, and the first camera sends the second checkerboard image to the center panel. Then, the head-up display projects a third checkerboard image (namely the third image in the above-mentioned embodiment), and the first camera photographs the third checkerboard image to obtain a fourth checkerboard image (namely the fourth image in the above-mentioned embodiment). The head-up display sends the third checkerboard image to the center panel, and the first camera sends the fourth checkerboard image to the center panel.

Then, the center panel obtains a relative conversion relationship between a first extrinsic parameter matrix of the AR camera and a second extrinsic parameter matrix of the head-up display according to a coordinate change relationship in the above-mentioned checkerboard image, and controls, according to the relative conversion relationship, the head-up display to project the image on the checkerboard display screen, which may be, for example, the windshield of the vehicle or the like.

The image projection method provided by the embodiment of the present application first acquires the first camera coordinate of the area to be calibrated in the camera coordinate system of the AR camera on the vehicle, and then acquires the relative conversion relationship between the first extrinsic parameter matrix of the AR camera and the second extrinsic parameter matrix of the head-up display on the vehicle, and determines, according to the first camera coordinate and the relative conversion relationship, the second camera coordinate of the projection symbol corresponding to the area to be calibrated in the coordinate system of the head-up display, so as to control, according to the second camera coordinate, the head-up display to project the image, where the image includes the projection symbol. In the solution of the embodiments of the present application, the first camera coordinate (recognized by the AR camera) of the area to be calibrated are converted to the coordinate system of the head-up display through the relative conversion relationship between the first extrinsic parameter matrix and the second extrinsic parameter matrix. Then the second camera coordinate of the projection symbol under the head-up display are obtained. According to the second camera coordinate, the image is projected, and finally, the real scene superposition of the projection symbol and the area to be calibrated is realized after the image is projected. The operation is simple and efficient, eliminating the need to manually adjust the parameters and repeated attempts.

Figure 7:
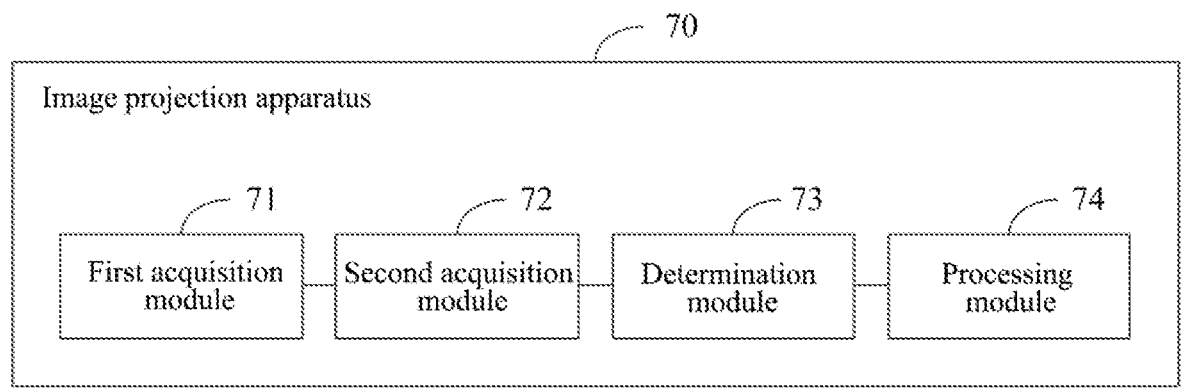
FIG. 7 is a schematic structural diagram of an image projection apparatus according to an embodiment of the present application.

FIG. 7 is a schematic structural diagram of the image projection device provided by the embodiment of the present application. As shown in FIG. 7, the device 70 includes: a first acquisition module 71, configured to acquire a first camera coordinate of an area to be calibrated in a camera coordinate system of an AR camera on a vehicle, where the area to be calibrated is located within a photographing range of the AR camera;

a second acquisition module 72, configured to acquire a relative conversion relationship between a first extrinsic parameter matrix of the AR camera and a second extrinsic parameter matrix of a head-up display on the vehicle;

a determination module 73, configured to determine, according to the first camera coordinate and the relative conversion relationship, a second camera coordinate of a projection symbol corresponding to the area to be calibrated in a coordinate system of the head-up display; and a processing module 74, configured to control, according to the second camera coordinate, the head-up display to project an image including the projection symbol.

In a possible implementation mode, the second acquisition module 72 includes:

a first acquisition unit, configured to acquire a first relative conversion relationship between the first extrinsic parameter matrix and a third extrinsic parameter matrix of a first camera, where the first camera is set at a preset position on a driving position of the vehicle;

a second acquisition unit, configured to acquire a second relative conversion relationship between the second extrinsic parameter matrix and the third extrinsic parameter matrix; and a third acquisition unit, configured to acquire, according to the first relative conversion relationship and the second relative conversion relationship, the relative conversion relationship.

In a possible implementation mode, the first acquisition unit includes:

a first acquisition subunit, configured to acquire a first image of a preset pattern photographed by the AR camera and a second image of the preset pattern photographed by the first camera, where the preset pattern is set in front of the vehicle;

a second acquisition subunit, configured to acquire a first intrinsic parameter matrix of the AR camera and a second intrinsic parameter matrix of the first camera; and a third acquisition subunit, configured to acquire, according to the first image, the second image, the first intrinsic parameter matrix, and the second intrinsic parameter matrix, the first relative conversion relationship.

In a possible implementation mode, the third acquisition subunit is specifically configured to:

acquire, for any first preset point on the preset pattern, a first world coordinate of the first preset point in a world coordinate system, a first image coordinate corresponding to the first preset point on the first image, and a second image coordinate corresponding to the first preset point on the second image;

acquire, according to the first world coordinate, the first image coordinate, and the first intrinsic parameter matrix, a first posture of the AR camera;

acquire, according to the first world coordinate, the second image coordinate, and the second intrinsic parameter matrix, a second posture of the first camera; and acquire, according to the first posture and the second posture, the first relative conversion relationship.

In a possible implementation mode, the second acquisition unit includes:

a fourth acquisition subunit, configured to acquire a third image projected by the head-up display and a fourth image obtained by photographing the third image with the first camera, where resolutions of the third image and that of the fourth image are the same;

a fifth acquisition subunit, configured to acquire a second intrinsic parameter matrix of the first camera and a third intrinsic parameter matrix of the head-up display; and a sixth acquisition subunit, configured to acquire, according to the third image, the fourth image, the second intrinsic parameter matrix, and the third intrinsic parameter matrix, a second relative conversion relationship.

In a possible implementation mode, the sixth acquisition subunit is specifically configured to:

acquire, for any second preset point on the third image, a second world coordinate of the second preset point in the world coordinate system, a third image coordinate corresponding to the second preset point on the third image, and a fourth image coordinate corresponding to the second preset point on the fourth image;

acquire, according to the second world coordinate, the third image coordinate, and the third intrinsic parameter matrix, a third posture of the head-up display;

acquire, according to the second world coordinate, the fourth image coordinate, and the second intrinsic parameter matrix, the second posture of the first camera; and acquire, according to the third posture and the second posture, the second relative conversion relationship.

In a possible implementation mode, the determination module 73 includes:

a determination unit, configured to determine, according to the first camera coordinate and the relative conversion relationship, a third camera coordinate of the area to be calibrated in the coordinate system of the head-up display; and a processing unit, configured to determine, according to a real scene superimposition between the area to be calibrated and the projection symbol, as well as the third camera coordinate, the second camera coordinate.

The image projection apparatus provided in the embodiment of the present application is configured to execute the foregoing method embodiment, and its implementation principle and technical effect are similar, which will not be repeated herein.

According to the embodiments of the present application, the present application also provides an electronic device and a readable storage medium.

According to the embodiments of the present application, the present application also provides a computer program product, including: a computer program stored in a readable storage medium from which at least one processor of an electronic device can read the computer program, and the at least one processor executes the computer program to cause the electronic device to execute the solution provided by any one of the above embodiments.

Figure 8:
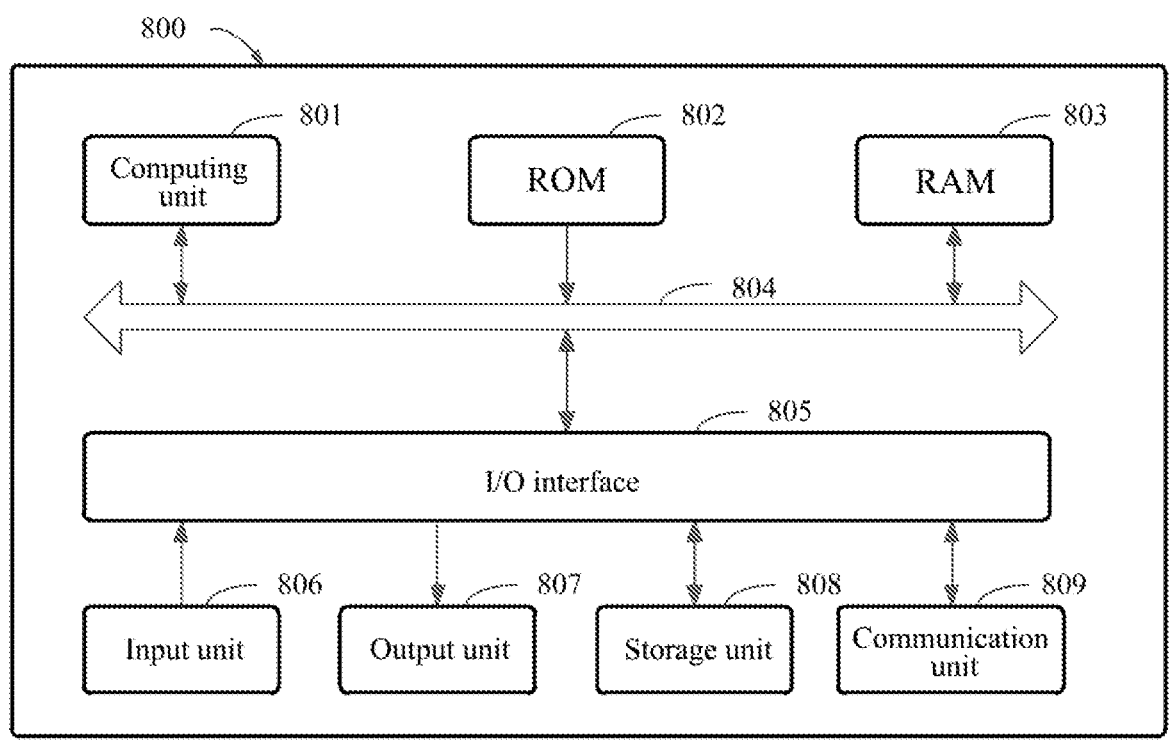
FIG. 8 is a schematic block diagram of an example electronic device according to an embodiment of the present application.

FIG. 8 is a schematic block diagram of an example electronic device 800 that can be configured to implement embodiments of the present application. The electronic device refers to various forms of digital computers, such as laptop computers, desktop computers, workstations, personal digital assistants, servers, blade servers, mainframe computers, and other suitable computers. The electronic device may also represent various forms of mobile devices, such as personal digital assistants, cellular phones, smart phones, wearable devices, and other similar computing devices. The components shown herein, their connections and relationships, and their functions are merely illustrative of and not restrictive on the implementation of the present disclosure described and/or required herein.

As shown in FIG. 8, the electronic device 800 includes a computing unit 801, which can perform various appropriate actions and processing according to a computer program stored in a read only memory (ROM) 802 or a computer program loaded from the storage unit 808 into a random access memory (RAM) 803. In the RAM 803, various programs and data required for the operation of the device 800 can also be stored. The computing unit 801, the ROM 902 and the RAM 003 are connected to each other through a bus 904. An input/output (I/O) interface 805 is also connected to the bus 804.

A plurality of components in the device 800 are connected to the I/O interface 805, including: an input unit 806, such as a keyboard, a mouse, etc.; an output unit 807, such as various types of displays, speakers, etc.; a storage unit 808, such as a magnetic disk, an optical disk, etc.; and a communication unit 809, such as a network card, a modem, a wireless communication transceiver, etc. The communication unit 809 allows the device 800 to exchange information/data with other devices through a computer network such as the Internet and/or various telecommunication networks.

The computing unit 801 may be various general-purpose and/or special-purpose processing components with processing and computing capacities. Some examples of the computing unit 801 include, but are not limited to, a central processing unit (CPU), a graphics processing unit (GPU), various dedicated artificial intelligence (AI) computing chips, various computing units that run machine learning model algorithms, a digital signal processor (DSP), and any suitable processor, controller, microcontroller, etc. The computing unit 801 performs various methods and processes described above, such as the image projection method. For example, in some embodiments, the image projection method can be implemented as a computer software program, which is tangibly contained in a machine-readable medium, such as the storage unit 808. In some embodiments, part or entire of the computer program may be loaded and/or installed on the device 800 via the ROM 802 and/or the communication unit 809. When the computer program is loaded into the RAM 803 and executed by the computing unit 801, one or more steps of the image projection method described above can be executed. Alternatively, in other embodiments, the computing unit 801 may be configured to execute the image projection method in any other suitable manner (for example, by means of firmware).

Various implementations of the systems and technologies described above herein may be implemented in digital electronic circuit systems, integrated circuit systems, field programmable gate arrays (FPGA), application specific integrated circuits (ASIC), application specific standard products (ASSP), system-on-chip (SOC), load programmable logic devices (CPLD), computer hardware, firmware, software, and/or combinations thereof. These various implementations may include: being implemented in one or more computer programs that can be executed and/or interpreted on a programmable system including at least one programmable processor, which can be a dedicated or general-purpose programmable processor and can receive data and instructions from and transmit data and instructions to a storage system, at least one input device, and at least one output device.

The program code for implementing the method according to the present disclosure can be written in any combination of one or more programming languages. These program codes may be provided to the processors or controllers of general-purpose computers, special-purpose computers, or other programmable data processing devices, such that the program codes, when executed by the processor or controller, cause the functions/operations specified in the flowcharts and/or block diagrams to be implemented. The program code may be executed entirely on the machine, partially on the machine, partially on the machine as an independent software package and partially on the remote machine, or entirely on the remote machine or server.

In the context of the present disclosure, a machine-readable medium may be a tangible medium that may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatus, or devices, or any suitable combination of the foregoing. More specific examples of the machine-readable storage medium may include electrical connections based on one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

In order to provide interaction with the user, the system and technology described here can be implemented on a computer that has: a display device used to display information to users (e.g., a cathode ray tube (CRT) or liquid crystal display (LCD) monitor); and a keyboard and a pointing device (e.g., a mouse or a trackball), through which the user can provide input to the computer. Other types of devices can also be used to provide interaction with the user; for example, the feedback provided to the user can be any form of sensory feedback (e.g., visual feedback, auditory feedback, or tactile feedback); and any form (including sound input, voice input or tactile input) can be used to receive input from the user.

The system and technology described here can be implemented in a computing system that includes back-end components (e.g., as a data server), or a computing system that includes middleware components (e.g., an application server), or a computing system that includes front-end components (e.g., a user computer with a graphical user interface or a web browser, and the user can interact with the implementation of the system and technology described here through the graphical user interface or web browser), or a computing system that includes any combination of such back-end component, middleware component, or front-end component. The components of the system can be connected to each other through any form or medium of digital data communication (e.g., a communication network). Examples of communication networks include: local area network (LAN), wide area network (WAN), and the Internet.

The computer system can include clients and servers that are generally far away from each other and usually interact with each other through a communication network. The relationship between the client and the server is generated by computer programs running on corresponding computers and having a client-server relationship with each other. The server can be a cloud server, also known as a cloud computing server or a cloud host, which is a host product in the cloud computing service system, to solve the defects of difficult management and weak business scalability in traditional physical host and VPS service ("Virtual Private Server", or VPS for short). The server can also be a server of a distributed system or a server combined with a blockchain.

Understanding that the various forms of processes shown above can be used to reorder, add or delete steps. For example, the steps described in the present application can be performed in parallel, sequentially, or in a different order, as long as the desired result of the technical solution disclosed in the present disclosure can be achieved, which is not limited herein.

The above specific implementations do not constitute a limitation on the scope of protection of the present application. Those skilled in the art should understand that various modifications, combinations, sub-combinations, and substitutions can be made according to design requirements and other factors. Any amendments, equivalent substitutions and improvements made within the spirit and principles of the present application shall be included in the scope of protection of the present application.

What is claimed is:

1. An image projection method, comprising:
   acquiring a first camera coordinate of an area to be calibrated in a camera coordinate system of an Augmented Reality (AR) camera on a vehicle, wherein the area to be calibrated is located within a photographing range of the AR camera;
   acquiring a relative conversion relationship between a first extrinsic parameter matrix of the AR camera and a second extrinsic parameter matrix of a head-up display on the vehicle, wherein the first extrinsic parameter matrix is used to realize a coordinate conversion between a world coordinate system and the camera coordinate system of the AR camera, and the second extrinsic parameter matrix is used to realize a coordinate conversion between the world coordinate system and a coordinate system of the head-up display;
   determining, according to the first camera coordinate and the relative conversion relationship, a second camera coordinate of a projection symbol corresponding to the area to be calibrated in the coordinate system of the head-up display; and
   controlling, according to the second camera coordinate, the head-up display to project an image comprising the projection symbol;
   wherein the acquiring a relative conversion relationship between a first extrinsic parameter matrix of the AR camera and a second extrinsic parameter matrix of a head-up display on the vehicle, comprises:
   acquiring a first relative conversion relationship between the first extrinsic parameter matrix and a third extrinsic parameter matrix of a first camera, wherein the first camera is set at a preset position on a driving position of the vehicle, wherein the third extrinsic parameter matrix is used to realize a coordinate conversion between the world coordinate system and a camera coordinate system of the first camera;
   acquiring a second relative conversion relationship between the second extrinsic parameter matrix and the third extrinsic parameter matrix; and
   acquiring, according to the first relative conversion relationship and the second relative conversion relationship, the relative conversion relationship.

2. The method according to claim 1, wherein the acquiring a first relative conversion relationship between the first extrinsic parameter matrix and a third extrinsic parameter matrix of a first camera, comprises:
   acquiring a first image of a preset pattern photographed by the AR camera and a second image of the preset pattern photographed by the first camera, wherein the preset pattern is set in front of the vehicle;
   acquiring a first intrinsic parameter matrix of the AR camera and a second intrinsic parameter matrix of the first camera, wherein the first intrinsic parameter matrix is used to realize a coordinate conversion between the camera coordinate system of the AR camera and a pixel coordinate system, and the second intrinsic parameter matrix is used to realize a coordinate conversion between the camera coordinate system of the first camera and the pixel coordinate system; and
   acquiring, according to the first image, the second image, the first intrinsic parameter matrix, and the second intrinsic parameter matrix, the first relative conversion relationship.

3. The method according to claim 2, wherein the acquiring, according to the first image, the second image, the first intrinsic parameter matrix, and the second intrinsic parameter matrix, the first relative conversion relationship, comprises:
   acquiring, for any first preset point on the preset pattern, a first world coordinate of the first preset point in the world coordinate system, a first image coordinate corresponding to the first preset point on the first image, and a second image coordinate corresponding to the first preset point on the second image;

acquiring, according to the first world coordinate, the first image coordinate, and the first intrinsic parameter matrix, a first posture of the AR camera;

acquiring, according to the first world coordinate, the second image coordinate, and the second intrinsic parameter matrix, a second posture of the first camera; and acquiring, according to the first posture and the second posture, the first relative conversion relationship, wherein the preset pattern comprises a checkerboard.

4. The method according to claim 1, wherein the acquiring a second relative conversion relationship between the second extrinsic parameter matrix and the third extrinsic parameter matrix, comprises:

acquiring a third image of a preset pattern projected by the head-up display and a fourth image obtained by photographing the third image with the first camera, wherein resolutions of the third image and that of the fourth image are the same;

acquiring a second intrinsic parameter matrix of the first camera and a third intrinsic parameter matrix of the head-up display, wherein the second intrinsic parameter matrix is used to realize a coordinate conversion between the camera coordinate system of the first camera and a pixel coordinate system, and the third intrinsic parameter matrix is used to realize a coordinate conversion between the camera coordinate system of the head-up display and the pixel coordinate system; and acquiring, according to the third image, the fourth image, the second intrinsic parameter matrix, and the third intrinsic parameter matrix, a second relative conversion relationship.

5. The method according to claim 4, wherein the acquiring, according to the third image, the fourth image, the second intrinsic parameter matrix, and the third intrinsic parameter matrix, a second relative conversion relationship, comprises:

acquiring, for any second preset point on the third image, a second world coordinate of the second preset point in the world coordinate system, a third image coordinate corresponding to the second preset point on the third image, and a fourth image coordinate corresponding to the second preset point on the fourth image;

acquiring, according to the second world coordinate, the third image coordinate, and the third intrinsic parameter matrix, a third posture of the head-up display;

acquiring, according to the second world coordinate, the fourth image coordinate, and the second intrinsic parameter matrix, the second posture of the first camera; and acquiring, according to the third posture and the second posture, the second relative conversion relationship, wherein the preset pattern comprises a checkerboard.

6. The method according to claim 2, wherein the acquiring a second relative conversion relationship between the second extrinsic parameter matrix and the third extrinsic parameter matrix, comprises:

acquiring a third image of a preset pattern projected by the head-up display and a fourth image obtained by photographing the third image with the first camera, wherein resolutions of the third image and that of the fourth image are the same;

acquiring the second intrinsic parameter matrix of the first camera and a third intrinsic parameter matrix of the head-up display, wherein the third intrinsic parameter matrix is used to realize a coordinate conversion between the camera coordinate system of the head-up display and the pixel coordinate system; and acquiring, according to the third image, the fourth image, the second intrinsic parameter matrix, and the third intrinsic parameter matrix, a second relative conversion relationship.

7. The method according to claim 6, wherein the acquiring, according to the third image, the fourth image, the second intrinsic parameter matrix, and the third intrinsic parameter matrix, a second relative conversion relationship, comprises:

acquiring, for any second preset point on the third image, a second world coordinate of the second preset point in the world coordinate system, a third image coordinate corresponding to the second preset point on the third image, and a fourth image coordinate corresponding to the second preset point on the fourth image;

acquiring, according to the second world coordinate, the third image coordinate, and the third intrinsic parameter matrix, a third posture of the head-up display;

acquiring, according to the second world coordinate, the fourth image coordinate, and the second intrinsic parameter matrix, the second posture of the first camera; and acquiring, according to the third posture and the second posture, the second relative conversion relationship, wherein the preset pattern comprises a checkerboard.

8. The method according to claim 1, wherein the determining, according to the first camera coordinate and the relative conversion relationship, a second camera coordinate of a projection symbol corresponding to the area to be calibrated in a coordinate system of the head-up display, comprises:

determining, according to the first camera coordinate and the relative conversion relationship, a third camera coordinate of the area to be calibrated in the coordinate system of the head-up display; and determining, according to a real scene superimposition between the area to be calibrated and the projection symbol, as well as the third camera coordinate, the second camera coordinate.

9. An image projection apparatus, comprising:

at least one processor; and a memory communicatively connected with the at least one processor; wherein, the memory stores instructions executable by the at least one processor, and the at least one processor, when executing the instructions, is configured to:

acquire a first camera coordinate of an area to be calibrated in a camera coordinate system of an Augmented Reality (AR) camera on a vehicle, wherein the area to be calibrated is located within a photographing range of the AR camera;

acquire a relative conversion relationship between a first extrinsic parameter matrix of the AR camera and a second extrinsic parameter matrix of a head-up display on the vehicle, wherein the first extrinsic parameter matrix is used to realize a coordinate conversion between a world coordinate system and the camera coordinate system of the AR camera, and the second extrinsic parameter matrix is used to realize a coordinate conversion between the world coordinate system and a coordinate system of the head-up display;

determine, according to the first camera coordinate and the relative conversion relationship, a second camera coordinate of a projection symbol corresponding to the area to be calibrated in the coordinate system of the head-up display; and control, according to the second camera coordinate, the head-up display to project an image comprising the projection symbol;

wherein the at least one processor is configured to:

acquire a first relative conversion relationship between the first extrinsic parameter matrix and a third extrinsic parameter matrix of a first camera, wherein the first camera is set at a preset position on a driving position of the vehicle, wherein the third extrinsic parameter matrix is used to realize a coordinate conversion between the world coordinate system and a camera coordinate system of the first camera;

acquire a second relative conversion relationship between the second extrinsic parameter matrix and the third extrinsic parameter matrix; and acquire, according to the first relative conversion relationship and the second relative conversion relationship, the relative conversion relationship.

10. The apparatus according to claim 9, wherein the at least one processor is configured to:

acquire a first image of a preset pattern photographed by the AR camera and a second image of the preset pattern photographed by the first camera, wherein the preset pattern is set in front of the vehicle;

acquire a first intrinsic parameter matrix of the AR camera and a second intrinsic parameter matrix of the first camera, wherein the first intrinsic parameter matrix is used to realize a coordinate conversion between the camera coordinate system of the AR camera and a pixel coordinate system, and the second intrinsic parameter matrix is used to realize a coordinate conversion between the camera coordinate system of the first camera and the pixel coordinate system; and acquire, according to the first image, the second image, the first intrinsic parameter matrix, and the second intrinsic parameter matrix, the first relative conversion relationship.

11. The apparatus according to claim 10, wherein the at least one processor is configured to:

acquire, for any first preset point on the preset pattern, a first world coordinate of the first preset point in the world coordinate system, a first image coordinate corresponding to the first preset point on the first image, and a second image coordinate corresponding to the first preset point on the second image;

acquire, according to the first world coordinate, the first image coordinate, and the first intrinsic parameter matrix, a first posture of the AR camera;

acquire, according to the first world coordinate, the second image coordinate, and the second intrinsic parameter matrix, a second posture of the first camera; and acquire, according to the first posture and the second posture, the first relative conversion relationship, wherein the preset pattern comprises a checkerboard.

12. The apparatus according to claim 9, wherein the at least one processor is configured to:

acquire a third image of a preset pattern projected by the head-up display and a fourth image obtained by photographing the third image with the first camera, wherein resolutions of the third image and that of the fourth image are the same;

acquire a second intrinsic parameter matrix of the first camera and a third intrinsic parameter matrix of the head-up display, wherein the second intrinsic parameter matrix is used to realize a coordinate conversion between the camera coordinate system of the first camera and a pixel coordinate system, and the third intrinsic parameter matrix is used to realize a coordinate conversion between the camera coordinate system of the head-up display and the pixel coordinate system; and acquire, according to the third image, the fourth image, the second intrinsic parameter matrix, the third intrinsic parameter matrix, the second relative conversion relationship.

13. The apparatus according to claim 12, wherein the at least one processor is configured to:

acquire, for any second preset point on the third image, a second world coordinate of the second preset point in the world coordinate system, a third image coordinate corresponding to the second preset point on the third image, and a fourth image coordinate corresponding to the second preset point on the fourth image;

acquire, according to the second world coordinate, the third image coordinate, and the third intrinsic parameter matrix, a third posture of the head-up display;

acquire, according to the second world coordinate, the fourth image coordinate, and the second intrinsic parameter matrix, the second posture of the first camera; and acquire, according to the third posture and the second posture, the second relative conversion relationship, wherein the preset pattern comprises a checkerboard.

14. The apparatus according to claim 10, wherein the at least one processor is configured to:

acquire a third image of a preset pattern projected by the head-up display and a fourth image obtained by photographing the third image with the first camera, wherein resolutions of the third image and that of the fourth image are the same;

acquire the second intrinsic parameter matrix of the first camera and a third intrinsic parameter matrix of the head-up display, wherein the third intrinsic parameter matrix is used to realize a coordinate conversion between the camera coordinate system of the head-up display and the pixel coordinate system; and acquire, according to the third image, the fourth image, the second intrinsic parameter matrix, the third intrinsic parameter matrix, the second relative conversion relationship.

15. The apparatus according to claim 14, wherein the at least one processor is configured to:

acquire, for any second preset point on the third image, a second world coordinate of the second preset point in the world coordinate system, a third image coordinate corresponding to the second preset point on the third image, and a fourth image coordinate corresponding to the second preset point on the fourth image;

acquire, according to the second world coordinate, the third image coordinate, and the third intrinsic parameter matrix, a third posture of the head-up display;

acquire, according to the second world coordinate, the fourth image coordinate, and the second intrinsic parameter matrix, the second posture of the first camera; and acquire, according to the third posture and the second posture, the second relative conversion relationship, wherein the preset pattern comprises a checkerboard.

16. The apparatus according to claim 9, wherein the at least one processor is configured to:

determine, according to the first camera coordinate and the relative conversion relationship, a third camera coordinate of the area to be calibrated in the coordinate system of the head-up display; and determine, according to a real scene superimposition between the area to be calibrated and the projection symbol, as well as the third camera coordinate, the second camera coordinate.

17. A non-transitory computer-readable storage medium storing computer instructions, wherein the computer instructions are used to cause a computer to perform the method according to claim 1.

18. A computer program product, wherein the computer program product comprises a computer program, which, when executed by a processor, implements the method according to claim 1.

* * * * *